United States Patent [19]

Halpern

[11] Patent Number: 4,661,691

[45] Date of Patent: Apr. 28, 1987

[54] PROXIMITY DATA TRANSFER SYSTEM

[75] Inventor: John W. Halpern, Novato, Calif.

[73] Assignee: Paperless Accounting, Inc., Washington, D.C.

[21] Appl. No.: 548,013

[22] Filed: Nov. 1, 1983

Related U.S. Application Data

[63] Continuation of Ser. No. 663,162, Mar. 2, 1976, abandoned, which is a continuation of Ser. No. 564,404, Apr. 2, 1975, abandoned, which is a continuation of Ser. No. 322,249, Jan. 9, 1973, abandoned, which is a continuation-in-part of Ser. No. 14,931, Feb. 27, 1970, abandoned.

[51] Int. Cl.$^4$ ............................................. G06K 5/00
[52] U.S. Cl. .................................. 235/375; 235/449; 235/492; 340/825.31
[58] Field of Search ................... 365/94, 97; 235/384, 235/449–451, 492, 375; 340/825.31–825.35

[56] References Cited

U.S. PATENT DOCUMENTS

| | | | |
|---|---|---|---|
| 3,637,994 | 1/1972 | Ellingboe | 235/61.12 N |
| 3,641,316 | 2/1972 | Dethloff | 235/61.7 B |
| 3,678,250 | 7/1972 | Dethloff | 235/61.11 R |

Primary Examiner—James W. Moffitt
Attorney, Agent, or Firm—Townsend & Townsend

[57] ABSTRACT

A proximity data transfer system for transferring data in digital form between a portable data carrying component and a data sensor component. The data carrying component includes a data store and circuitry for producing magnetic field disturbances of a form related to the data stored therein. The data sensor component includes circuitry capable of sensing the field disturbances, interpreting these disturbances as binary information and inserting the information in a register.

28 Claims, 24 Drawing Figures

PROXIMITY DATA TRANSFER SYSTEM

STATEMENT OF RELATED CASES

This application is a continuation of application Ser. No. 663,162 filed Mar. 2, 1976, now abandoned, which is a continuation of application Ser. No. 564,404, filed Apr. 2, 1975, now abandoned, which is a continuation of application Ser. No. 322,249, filed Jan. 9, 1973, now abandoned, which is a continuation-in-part of application Ser. No. 14,931 filed Feb. 27, 1970, now abandoned.

BACKGROUND OF THE INVENTION

This invention relates to a data transfer system.

The need for introducing a small package of data as a matter of routine into some data processing system occurs quite often. One such need arises when the identify of a person is to be established in conjunction with a service rendered to that person. Other requirements are: the rapid injection of a programming of control function into the control unit of a mechanism, into a calculating unit, or the combination of both.

The most widely known systems for responding to this need utilize punched cards, punched tape, magnetic tape, magnetic cards and magnetic tablets.

Punched cards and magnetic tablets would seem to be the most suitable devices for establishing the identity of a person because they can readily be carried about. However, such devices have several important disadvantages. One notable disadvantage is that the record of a coded identity number is not tamper-proof. In punched cards, holes may be added by punching or blocked with adhesive tape. Magnetic markings are more difficult to change rationally without detection but a skilled person may succeed in this. In addition to these disadvantages, accidental factors exist which without any deliberate action may cause the record to be altered. For example, the proper use of the cards or tablets may require skill and good eye-sight which are not always available where the general public is concerned.

The need thus exists for a system which uses a data store which is readily portable and carries the data in a form which makes tampering virtually impossible, and a data sensor which becomes instantly and automatically operative to receive the data when the data store is brought into proximity with the data sensor and to perform particular functions according to the data received.

SUMMARY OF THE INVENTION

This invention comprises a new form of proximity data transfer which provides the above noted capabilities and which may be arranged to provide either one-way transfer of data or or a two-way transfer of data. As a proximity one-way data transfer device, the invention may be used for injecting a control function into an automatic mechanism or may aid the identification of a person entitled to receive a service. As a proximity two-way data transfer device, the invention may be used for many purposes, such as a credit card having an active register for storing updatable credit information, e.g. available credit balance.

Several practical embodiments of the invention are described below. The common significant feature for all these modes is the ability of the system to perform the transfer of data without the aid of any scanning movement and without the aid of any physical links such as electrical conductors.

In all its forms this invention offers certain characteristic operational advantages. One such advantage resides in the fact that no personal identifying matter need be surrendered to a machine, although this can be allowed for if desired. Further, the invention requires no moving parts and no close tolerances are required. Other advantages are made evident from the ensuing description.

A proximity data transfer system according to the invention incorporates a self-contained transportable data-carrying component including a data store and means capable of providing a succession of magnetic field disturbances each characteristic of a respective one of a number of bits of data in the store, and a data sensor component including inductor means capable of being influenced by and producing an output in accordance with the field disturbances, a data-receiving register and means connected to the inductor means and the register and operable to accept the output of the inductor means, interpret it as data and insert such data in the data-receiving register.

The system may be so constructed and arranged that the data carrying component has a size and shape which permit it to be readily carried about by the user. Further, the data sensor component may incorporate at least one inductor coil or loop whose electro-magnetic field geometry is such that the field of the coil or loop traverses a major portion of the data-carrying component when the latter is placed into a reading or writing position so that the coil or loop can mediate the transfer of more than one data bit between the data carrying component and the data sensor component without requiring any relative motion between the two components.

The device may further be arranged in such a manner that the data-carrying component contains at least one inductor coil whose electro-magnetic field geometry is such that, when the said component is in its appropriate proximity position relative to the data sensor component, the coil of the data-carrying component and the coil of the data sensor component have a mutual inductance which is greater than the self-inductance of either coil separately.

The data-carrying component may incorporate at least one inductor winding, a shift register as the data store operatively connected to the inductor winding and means for reducing the resistance of the circuit of the inductor winding to a low level and raising it to a high level according to the level of the signal from the register representing each bit of data. The data sensor component may incorporate at least one inductor winding, an oscillator, the output of which is connected to the winding, a shift register and means operable to receive the output of the winding and feed only those pulses of a chosen polarity to the register, the data-carrying component and the data sensor component being so shaped that their inductor windings may be brought into inductive proximity with one another.

The means for lowering and raising the resistance of the circuit of the inductor winding of the data-carrying component may be a controlled diode having a control element connected to the shift register of the data-carrying component and operable to control the resistance of the diode according to the level of the voltage applied to the control element.

The construction just described is a one-way data transfer device, i.e. it can transfer data from the data-carrying component to the data sensor component only. For making provision for transferring data also from the data sensor unit to the data-carrying component, the data-carrying component may incorporate means connected to the inductor winding for sampling an input signal therefrom representing data to be transferred to the data-carrying component and a gate arranged to control the input of data from the inductor winding to the register.

A complete two-way data transfer device according to the invention, therefore, comprises the following main elements: The data-carrying component as a separate, portable unit; electric sensor devices for sensing and producing a succession of field force changes in the environment of the data-carrying component; a temporary receiving register unit exterior to the data carrying component for temporarily receiving information from the data carrying component; a clock pulse oscillator unit; means for passing the contents of the temporary receiving register to circuits for executing comparator and arithmetic functions; an encoder unit for manually setting such parameters as are needed for carrying out the processing function in a computer unit and from which the resulting data are serially clocked out to pass through a modifier unit to give the signals the shape in which they can be transferred to the data carrying component.

In one embodiment of the invention, the electric sensor component is associated with an oscillator of square pulses providing a burst of n+1 pulses, where n is the number of bits of a word to be transferred to the data carrying component. In this embodiment, the modifying unit is arranged to modify or leave unchanged the trailing edge of each square pulse according to the logical level of the bit to be transferred, whereas the leading edge of the square pulse is employed as a phase-advanced shift pulse for operating the shift register of the data carrying component.

The two components, that is, the data carrying component and the electric sensor device external to the data carrying component, may each include an additional inductor winding, that in the data sensor component being connectible to a supply of alternating current and that in the data-carrying component being connected to a rectifier, the rectified current being used for operation of the circuits in the data-carrying component.

The data store of the data-carrying component may consist of x bistable memory units each constituted by a flip flop incorporating two transistor groups, each group incorporating at least one transistor, the collector leads of the transistors incorporating electro-magnetic loads so arranged as to produce magnetic fluxes of oppositely directed polarity when energized by current flowing in the collector circuits. The electro-magnetic modes may incorporate wound cores arranged to be traversed by the current in the collector circuits, the respective cores of the two transistor groups being wound in opposite directions. The sense of magnetization of the cores will thus reflect the state of the bistable unit whichever transistor is conducting. If the operating current should be interrupted and then re-applied, the opposite remanent magnetisms in the two cores will cause a higher counter-electromotive force to be generated in the collector lead of the transistor not previously conducting than in the collector lead of the transistor previously conducting so that the rises of currents in the two leads will be uneven and favoring the transistor which was previously conducting. This construction is of great importance because it removes what was previously a serious objection to the use of a flip flop as a memory unit: viz. that previously any interruption of the current supply caused immediate and permanent loss of the information stored in the unit.

In an alternative construction, the data store of the data-carrying unit may consist of a magnetic shift register such as described in the publication entitled "Square-Loop Ferrite Core Switching", Dr. P. A. Neeteson, Philips Technical Library, 1964, connected to inductor windings of which at least one is a drive coil, at least one is a data input coil and at least one is a data output coil, the data sensor component incorporating corresponding inductor windings, the data-carrying component and the data sensor component being so shaped that the respective windings of one component may be brought into inductive proximity with the corresponding respective windings of the other component. In this construction the data sensor component may conveniently be tubular and the data-carrying component may have the shape of a rod.

In another alternative construction, the data-carrying component comprises a magneto strictive element which may be a plate or a rod capable of being magnetized over discrete portions along its length, and the data sensor component incorporates inductive windings in the form of electro-magnets disposed in proximity with respective magnetized portions of the magneto strictive element when the two components are placed in operative proximity, the data sensor component also incorporating means for inducing momentarily a strictional stress in a portion of the element lying between one end of the element and the first magnetized portion. In this embodiment, the electromagnets of the data sensor component may be connected to a data-receiving register and/or to an encoder. Further, the means for inducing a strictional stress in the element may be a winding connectible to a pulse-producing means. In this embodiment the end of the element opposite to that in which the strictional stress is induced during operation may be fitted with a stress-damping material.

DESCRIPTION OF THE PREFERRED EMBODIMENTS

Figure 1:
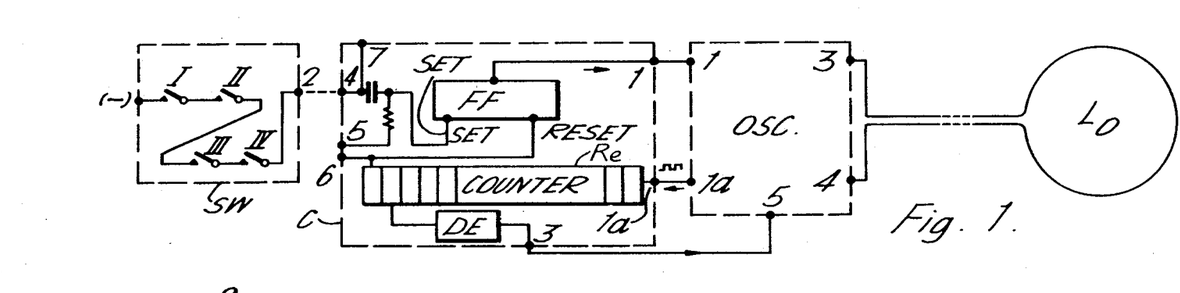
FIG. 1 is a diagram showing one form of control circuit for setting the devices in operation.

Turning now to the drawings and referring first to FIG. 1, SW denotes a switch assembly containing four switches I, II, III, IV operable by a data-carrying component placed in operative proximity to the sensor device. These switches may conveniently be capacitive switches. The reason for having more than one switch is to ensure that the data-carrying component is placed into the sensing area in a proper operative position. Only if all the four switches are closed will a voltage appear at terminal 6 of the control unit C. This voltage sets a flip flop unit FF which produces an enabling voltage for an oscillator OSC which thereupon begins to inject square pulses into a register Re of the data sensor and an inductor winding constituted by a loop LO. The last pulse resets the flip flop unit FF and stops the oscillator. To ensure that no further square wave or any part thereof is generated, the second-last unit of the register Re is tapped and over a delay unit DE a signal is fed back to terminal 5 coupled to the control circuit of the oscillator OSC to suppress its action when the last unit of the register Re is pulsed. As long as the switches I, II, III, IV remain closed no further burst of pulses can develop. Thus, it is only after the data-carrying component is taken away that the system is ready to sense another data-carrying component.

Figures 2, 3, 4:
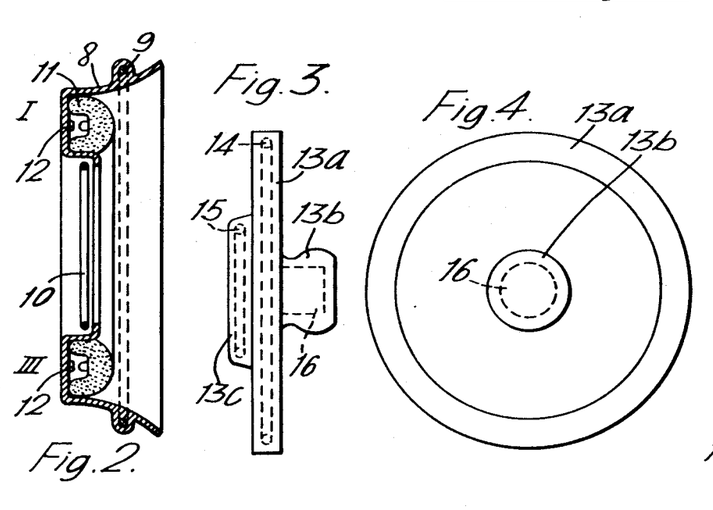
FIG. 2 illustrates in diametral section a data sensor component into which a data-carrying component is insertable for processing of the data contained therein.
FIGS. 3–6 show two forms of data-carrying components in the form of tablets, each form being shown in side elevation and in plan respectively.

In the data sensor unit illustrated in FIG. 2 the frame 8 contains an inductor winding in the form of a loop 9 (LO of FIG. 1) and an annular pad 11 on which are mounted the switches I, II, III, and IV at 90° intervals. A further concentric coil 10 may be contained in the sensor device for a purpose to be explained later.

Figure 5:
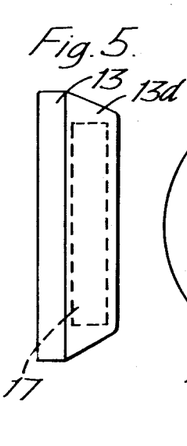
Figure 6:
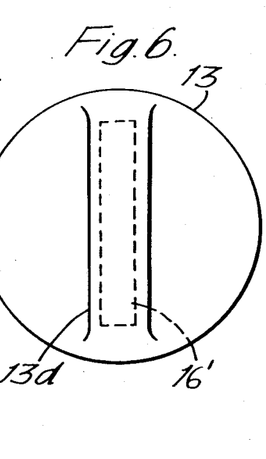

The data carrying component illustrated in FIG. 3 consists of a disc-like plate $13_a$ which contains the electronic components described below, an outer inductor loop 14, a knob-like extension $13_b$, and optionally a shallow extension $13_c$ containing a further circuit loop 15 also for a purpose described below. Inside the knob-like extension a long-life battery 16 is placed. The data-carrying component illustrated in FIGS. 5 and 6 has a web-like extension $13_d$ housing a battery 16' of greater length than the battery 16.

By placing the disc 13 of either embodiment of the data-carrying component against the pad 11, the switches I–IV of FIG. 1 are closed. Loops 9 and 14 as well as optional coils 10 and 15, where provided interlink inductively. To improve the coupling factor, the affected neighborhood of the coil pairs may be suitably shaped using materials of high permeability.

Figure 7:
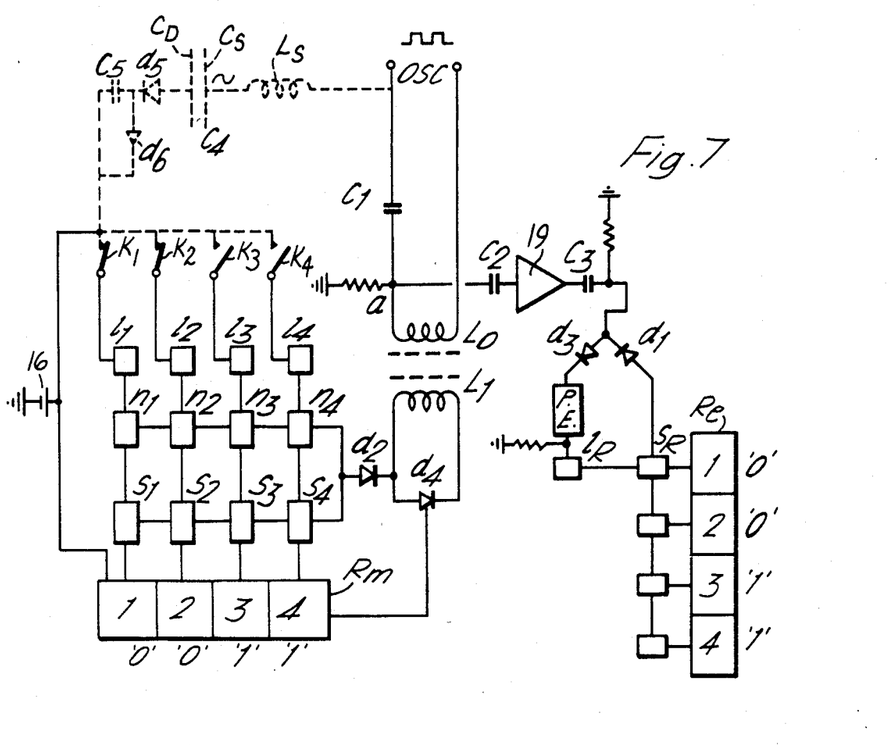
FIG. 7 shows the basic circuit of a one way transfer device arranged to provide only that data stored in a data-carrying component can be processed and an indication given that such data is accepted or rejected.

With reference to FIG. 7, when oscillator OSC of FIG. 1 becomes operative on closure of the switches I–IV a burst of pulses is generated conveniently at a frequency of 50 to 500 KHz. The coil $L_o$ (9 of FIG. 2) is connected to the square wave oscillator OSC via a condenser $C_1$ in a differentiator configuration. $L_1$ (coil 14 of FIG. 3) is a coil built into the data-carrying component, which latter incorporates a shift register $R_m$. The voltage source for this register may be battery 16 of FIG. 3 which also supplies an enabling voltage for level inputs $l_1$–$l_4$, described below. For this elementary explanation it is assumed that the register $R_m$ has d.c. parallel bit-setting level inputs $l_1$ to $l_4$ and masking NAND gates $n_1$–$n_4$ as well as serial shift pulse inputs $s_1$–$s_4$.

Figure 23:
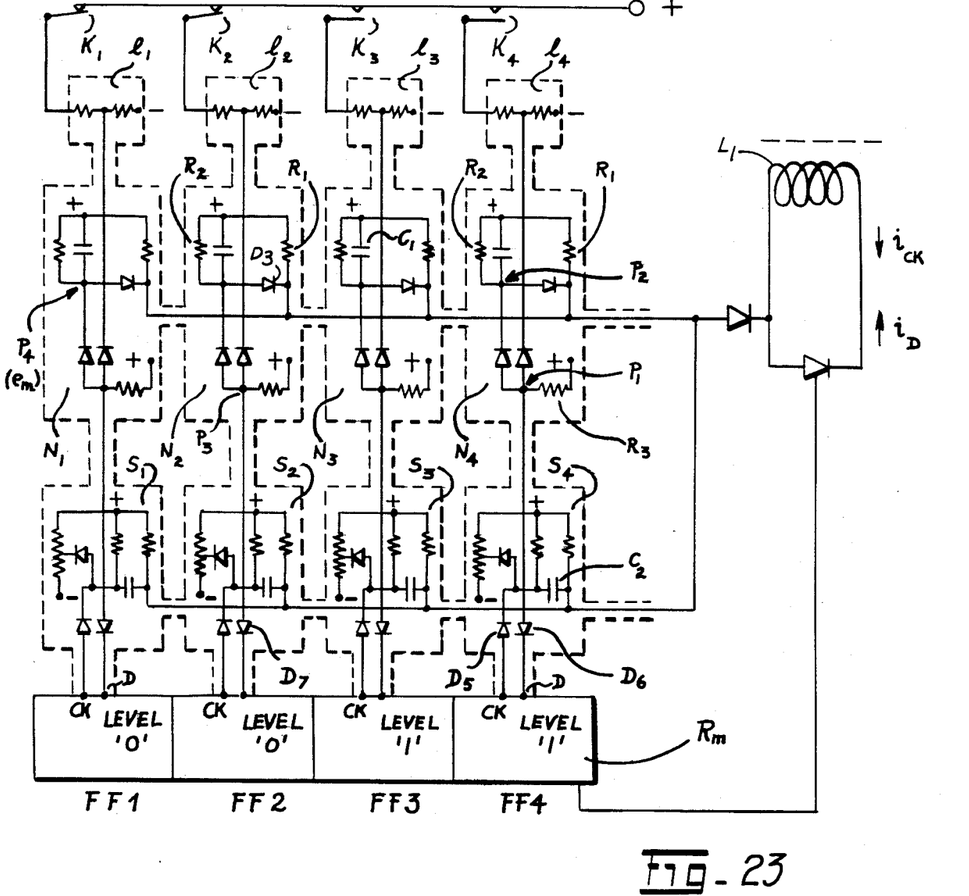
FIG. 23 is a diagram illustrating elements $l_1$–$l_4$, $n_1$–$n_4$ and $s_1$–$s_4$ of FIG. 7.
Figure 24:
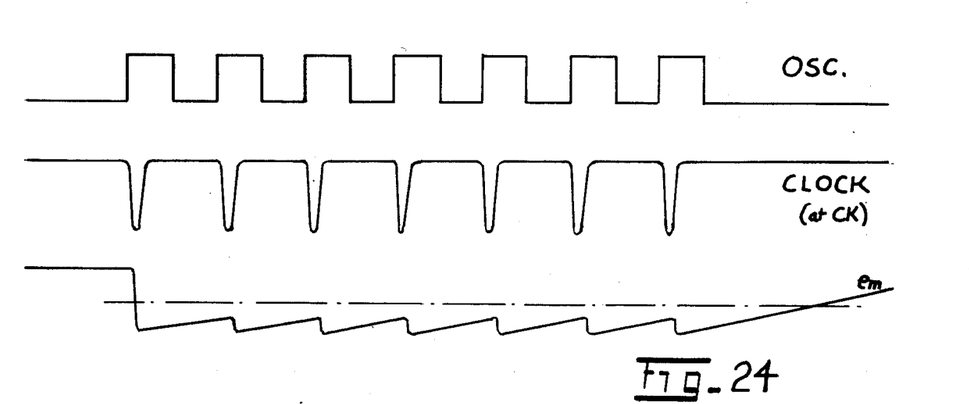
FIG. 24 is a wave form diagram illustrating the operation of the FIG. 23 circuit elements.

With reference to FIGS. 23 and 24, the operation of the bit-setting level inputs $l_1$–$l_4$, masking NAND gates $n_1$–$n_4$ and serial shift pulse inputs $s_1$–$s_4$ housed in the data-carrying component proceeds as follows. In the normal state with no pulses applied to diode $d_2$ and supply voltage present at the + terminals shown in FIG. 23, register $R_m$ contains a predetermined data word, the value of which is established by the state of contacts $K_1$–$K_4$. Contacts $K_1$–$K_4$ are hard wired electrical connections which are unalterable in the preferred embodiment. In the illustrated embodiment this data is the four bit binary word 1100, which may be a customer account identifying number or the like, it being understood that this particular binary word is illustrative only and that other length words may be employed, depending upon the particular desired application.

The data word is set into register $R_m$ in the following manner. With reference to elements $l_4$, $n_4$, $s_4$, when supply voltage is applied to the + terminals, current flows from the + terminal of NAND gate $l_4$ through resistor $R_3$ to junction $P_1$, thence to $l_4$ and through a resistor to ground, designated by the symbol—terminal. This current flow establishes junction $P_1$ at a first predetermined voltage level. Junction $P_1$ is coupled to the level setting input of flip flop FF4 via diode $d_6$. With reference to elements $l_2$, $n_2$, $s_2$, current flows from the + terminal of NAND gate $n_4$ through resistor $R_3$ thereof to junction $P_3$, thence to $l_2$ and through a resistor to ground. Since $K_2$ is closed, however, the supply voltage is coupled therethrough to the remaining terminal of $l_2$. The application of supply voltage through $K_2$ to the remaining terminal of $l_2$ causes the value of the current through resistor $R_3$ of NAND gate $n_2$ to be less than that in the corresponding branch of NAND gate $n_4$, so that the voltage at junction $P_3$ is greater than that at junction $P_1$. Junction $P_3$ is coupled to the level input of flip flop FF2 via diode $d_7$. Flip flops FF2–FF4 are provided with internal bias voltages which permit diode $d_7$ to be forward biased by the magnitude of the voltage at junction $P_3$ and which prevent diode $d_6$ from being forward biased by the magnitude of the voltage of junction $P_1$. Thus, flip flop FF2 is set to one configuration by the voltage at junction $P_3$ while flip flop FF4 is maintained in the opposite configuration by the blocking action of diode $d_6$. The operation of elements $K_3$, $l_3$, $n_3$, $s_3$ is similar to that already described for elements $K_4$, $l_4$, $n_4$, $s_4$; the operation of elements $K_1$, $l_1$, $n_1$, $s_1$ is similar to that described for elements $K_2$, $l_2$, $n_2$, $s_2$. As will be apparent to those skilled in the art, the value of the individual circuit components may be selected in accordance with known principles to provide the above noted operation.

When negative clock pulses shown in FIG. 24 are generated in the secondary circuit containing coil $L_1$ in the manner described below, these pulses are passed by diode $d_2$ to masking NAND gates $n_1$–$n_4$ and serial shift pulse inputs $s_1$–$s_4$. The application of the first negative shift pulse to masking NAND gates $n_1$–$n_4$ causes the development of a masking voltage $e_m$ shown in FIG. 24, which disables operation of the level setting inputs to flip flops FF1–FF4 of register $R_m$, thus preventing contacts $K_1$–$K_4$ from affecting the contents of register $R_m$ so long as voltage $e_m$ is maintained below the indicated masking threshold. The subsequent negative clock pulses maintain masking voltage $e_m$ below the masking threshold. This action proceeds as follows.

With reference to circuit elements $l_2$, $n_2$, $s_2$, a negative pulse passed by diode $d_2$ is coupled through diode $d_3$ charging capacitor $C_1$, thereby causing the voltage at junction $P_4$ and consequently junction $P_3$ to drop below the masking threshold level. This drop in voltage at junction $P_3$ causes diode $D_7$ to be blocked. The time constant of the discharge circuit including capacitor $C_1$ is chosen sufficiently long so that a subsequent negative clock pulse is coupled to diode $d_3$ before the voltage at $P_3$ rises above the masking threshold. Thus, so long as negative clock pulses are being received, the voltage at $P_3$ is maintained below the masking threshold and diode $d_7$ is blocked, thereby preventing flip flop FF2 from being reset to the original configuration.

As each clock pulse is received by diode $d_2$, it is also coupled via capacitor $C_2$ and diode $d_5$ of $s_4$ to the clock input of flip flop FF4. Each clock pulse is also coupled in a similar manner to the clock input of the remaining flip flops of register $R_m$. Thus, the contents of each flip flop of this register are clocked into the succeeding flip flop by each clock pulse. Each flip flop is also internally configured to return to the "I" state after the contents of flip flop FF1 have been clocked into flip flop FF4 and used to control the state of diode $d_4$.

After the last clock pulse has been generated and no further pulses are received, the masking voltage at the NAND gate junctions (eg. junction $P_3$ of NAND gate $n_2$) rises above the masking threshold. Thereafter, flip flops FF1–FF4 are returned to their original data bearing configuration in the manner described above, the states of contacts $K_1$–$K_4$ controlling the quiescent state ot their associated flip flops.

It is understood that other known logic circuitry may be utilized for providing the above functional operation of the data-carrying component. For equivalent circuits reference may be had to the "Small Computer Handbook" published in 1966 by the Digital Equipment Corporation of Maynard, Mass. the disclosure of which is hereby incorporated by reference.

With reference to FIG. 7, the coil $L_1$ is closed via a controlled diode $d_4$, e.g. a thyristor diode, the steering electrode of which is connected to the output of the register $R_m$. As noted above, diode $d_2$ ensures that only negative shift pulses act on the register $R_m$.

Figure 8:
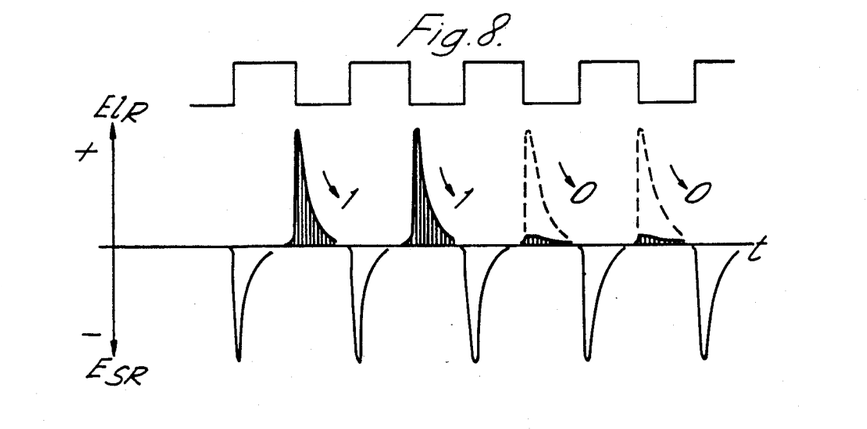
FIG. 8 is an explanatory diagram given to assist in the explanation of the working of the device in FIG. 7.

FIG. 8 shows the negative and positive spikes which tend to develop across the coil $L_1$ as square waves reach the condenser $C_1$. The positive voltage spikes tend to pass current through diode $d_4$ and do so if the control voltage for diode $d_4$ so permits. In the preferred embodiment a control voltage corresponding to the logical level "1" from the output of shift register $R_m$ renders $d_4$ non-conductive whereas a control voltage corresponding to the logical level "0" renders diode $d_4$ conductive even though there may be a remanent resistance of 1 to 2 Ohms. When diode $d_4$ is conductive, coil $L_1$ absorbs energy and therefore draws energy also from the coil $L_o$. Provided the source impedance of the oscillator is relatively high and the transformer linkage is reasonably good, this secondary load will cause the voltage swing at the point "a" to break down. FIG. 8 exemplifies the voltage curve for the shift pulses and the readout pulses at point "a", said FIG. 8 also illustrating the voltage-time curve for the binary number 1100 stored in and read out from the data-carrying component. These digital spikes are converted into an input in shift register $R_e$ located in the data sensor component in the following manner.

FIG. 7 shows a coupling condensor $C_2$, an amplifier 19 and a path divider for the negative and positive signal swings. The latter are applied to the level setting input $l_R$ and the shift pulse input $S_R$ terminals of the data sensor register $R_e$. The first negative pulse which reaches $l_R$ produces a shift by one bit to ensure that the first memory bit position is cleared. Next, the positive spike arrives to set the first memory bit position to a logical "1". After that, a negative shift pulse arrives which shifts the information bit "1" to the memory bit adjacent to the first one. Thereafter, a second positive spike arrives which sets the now cleared first memory bit position to the level "1". The next two clock pulses are followed by no level input. Thus, after four clock pulses the memory bit positions one and two contain "0"s and the positions three and four contain "1"s. The speed of the data transfer depends primarily on the operating frequency of the square wave oscillator OSC of FIG. 7. At 500 kHz a fifty bit word is transferred in $10^{-4}$ seconds.

As noted above, in the preferred embodiment, the data carrying component contains small long-life battery 16 for providing a supply voltage to register $R_m$ and an enabling voltage for elements $l_1$–$l_4$, $n_1$–$n_4$ and, $s_1$–$s_4$. The life of this battery can be substantially prolonged by incorporating into the supply line a thyristor which normally presents a high resistance, and becomes conductive only after the arrival of the first signal pulse.

Alternatively, the voltage supply circuit may comprise elements $L_s$ and plate $C_s$ of capacitor $C_4$ associated to the data sensor unit and plate $C_D$ of capacitor $C_4$, capacitor $C_5$ and diodes $d_5$, $d_6$ mounted in the data-carrying component may be employed as a source for level inputs $l_1$–$l_4$ and register $R_m$. If desired, these elements may also be used in conjunction with battery 16 to derive a replenishing voltage for recharging battery 16 when data is being extracted from the data carrying component.

Figures 9, 10:
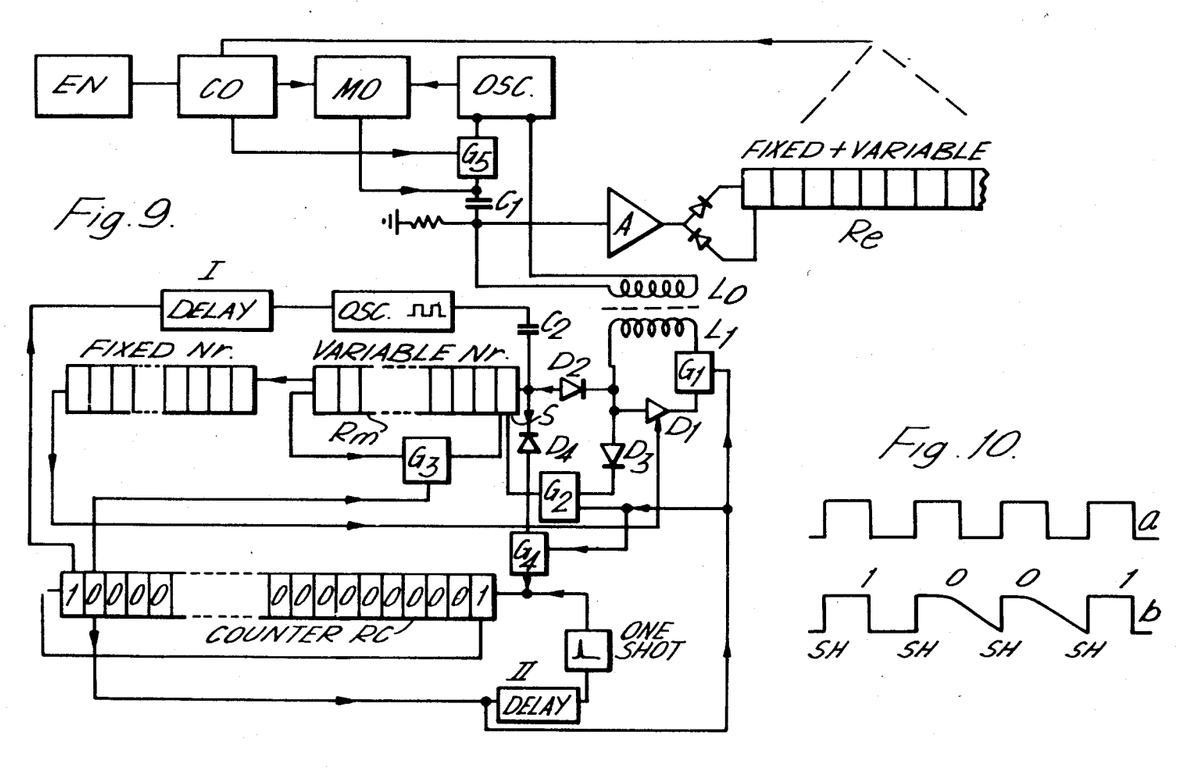
FIG. 9 is a diagram of a device capable of transferring data in two directions between the data-carrying component.
FIG. 10 is an explanatory diagram given to assist in the explanation of the working of the device of FIG. 9.

Reference is now made to FIG. 9 which shows diagrammatically a device for not only transferring an identity number from the portable component to a sensor component, but also for inserting new data into the portable data-carrying component. In this FIG. register $R_m$ is depicted as comprising two portions: a first portion for containing variable data only, and a second portion for containing fixed data, such as a customer account number. The operation of the fixed data portion is similar to that described above with reference to FIG. 7, while the operation of the variable data portion differs from that of the fixed data portion in the manner described below. To avoid needless repitition of known elements, the supply source and logic elements shown in FIG. 7 have been omitted from FIG. 9 it being understood that these elements are included in the embodiment of FIG. 9.

The lower part of FIG. 9 incorporates the coil $L_1$ with all its associated components, these being combined in the portable data-carrying component. The upper part incorporates the coil $L_o$ and associated functional units of the data sensor. Those circuit elements which are required for reading out the contents of the data-carrying component are essentially the same as those described in conjunction with FIGS. 7 and 8. All the additional circuit elements are thus required for performing the transfer of data in the opposite direction, i.e. into the data-carrying component. The data sensor of the FIG. 9 embodiment includes register $R_e$ similar to register $R_e$ of FIG. 1, but modified to accept both the fixed data and the variable data from register $R_m$ of the data-carrying component. Register $R_e$ is coupled to an associated computer CO which processes the data received from register $R_e$ in any appropriate manner. Also coupled to computer CO is an encoding unit EN, the nature of which depends on the particular application. Encoding unit EN, eg., may comprise a cash register for providing data indicating the total purchases for a given transaction. In such an application, computer CO may be a computer for processing this data and subtracting the result from a running credit balance (the variable data from $R_m$). Likewise, encoder EN may comprise a device for providing data indicating total pumped gallonage and price per gallon of an operated gasoline pump, while computer CO may be a computer for processing this data and adding the result to a running total (the variable data from $R_m$). Computer CO may also provide a compare operation for comparing the value of the fixed data fetched to register $R_e$ of the data sensor from register $R_m$ of the data-carrying component. This compare operation may be utilized to flag bad accounts or stolen data-carrying components, to identify a data-carrying component which is valid for a particular data processing system, or the like. Since the actual configuration of computer CO and encoding unit EN is not essential to an understanding of the invention, structural details of these units have been omitted to avoid prolixity.

To explain the working of the device of FIG. 9 it will be assumed that the data word in the data-carrying component has been read out and inserted into the register $R_e$. The contents of register $R_e$ are checked for acceptability and then processed in accordance with a given program contained in associated computer CO and the information provided by Encoder unit EN. The resulting data is applied together with clock pulses from oscillator OSC to a modulator unit MO which modifies the data in the manner described below. The modified data is coupled to coil $L_0$ via capacitor $C_1$ and transferred to the data-carrying component. A control signal from computer CO is applied to gate G5 prior to commencing the final phase of clocking out the new data from transfer into the data carrying component in order to prohibit the passage of clock pulses from pulse generator OSC directly to the coupling condensor $C_1$ during transfer of new data to the data carrying component. The manner in which a serially clocked out binary number is represented by a modified square wave pulse chain, is illustrated by FIG. 10, showing the unmodified clock pulses as the upper wave form and the modified clock pulses as the lower wave form. Each serial "1" bit, is represented by an unmodified trailing edge; each serial "0" bit is represented by a modified (blunted) trailing edge. The leading edges, however, retain in all cases their fast rise time character. As will be apparent to those skilled in the art, a blunted trailing edge will produce environmental field forces in the vicinity of the data carrying component which are much softer and accordingly call forth signals of a lower peak in the data-carrying component than those clock pulse edges which retain their rapid rise and fall times. This applies equally to inductive and capacitive sensor devices, which have to be employed for converting field force changes into voltage, or current changes respectively. As a result, in the secondary circuit including coil $L_1$, the positive spikes remain only for the "1" levels, whereas for the "0" levels they are absent. The positive spikes are applied via a gate $G_2$ and a pulse extender if desired as level setting signals at the serial input S of the data-carrying component shift register $R_m$. In this way the computation result is inserted into the variable portion of the register $R_m$. It is noted that there is no need for reinserting the fixed number into register $R_m$ as its readout was non-destructive.

These additional circuit elements operate in the following way. The counter $R_C$ contains as many bits plus one as the number contains binary bits. In its quiescent condition, the counter consists of zero levels except for one bit on the left and one bit on the right which are set to a "1" logical level. In this condition the last-but-one bit on the left is an "0", and controls gates $G_3$ and gate $G_1$ in such a way that they have a low impedance, whereas $G_2$ is non-conductive. If, however the last-but-one bit on the left is a logical "1" voltage level, the gates $G_3$ and $G_1$ become non-conductive whereas $G_2$ permits a signal to pass through it. The counter is in its quiescent condition when, as shown, all the bits are "0"s and flanked by a "1" bit on each side.

Assume a spurious signal having the characteristics that enable it to step the counter and the shift register $R_m$ is induced in the coil $L_1$. Such a signal would falsify the variable number in the register $R_m$. This cannot of course be risked. The system, however, automatically re-sets both the variable number to its original value, and also returns the counter into its quiescent condition if such a spurious signal is induced. This action proceeds as follows. The last bit on the left of the circulation counter has become an "0". This enables the oscillator OSC after a period of delay. The period of $D_f$ is set so that it is marginally longer than the normal read-write cycle of the system. If within the period the "1" has not returned to the counter end bit, the internal oscillator OSC will start and step both the shift register $R_m$ and the counter circuit until the oscillator OSC is stopped by the appearance of a "1" at the last counter bit. This self-regenerating process restores the original contents of the register $R_m$ in spite of the action of spurious signals tending to change it.

In the case of a genuine readout cycle a non-destructive transfer of the number contained in the data carrying component takes place. Such a readout has its condition that a correct sampling input of clockpulses from the oscillator OSC 1 has occurred, namely a burst of clock pulses having the correct number of pulses and delivered within a maximum period of time (say 1 ms). It is only then that the last-but-one bit on the left becomes a logical "1" which closes $G_3$ thereby henceforth stopping the register $R_m$ from re-circulating, and closes also gate $G_1$ which henceforth makes diode $D_1$ ineffective, and closes gate $G_4$ which henceforth prevents the counter RC from being actuated upon by negative shift pulses reaching it via diode $D_4$. When, therefore, the next phase in the read/write cycle, begins, namely, the clocking out of the data processed by unit CO in the form indicated by FIG. 10a, the negative spikes can have no effect on the counter RC but only on shift register $R_m$. As the number contained in register $R_m$ is shifted it is emptied while the new data are being entered into it by way of diode $D_3$ and gate $G_2$. The delay period of unit "DELAY II" is selected to be marginally longer than the combined read/write cycle just described. After the lapse of this delay period, the ONE SHOT monostable circuit is triggered and this shifts the counter RC by one bit, thereby restoring the quiescent condition. The data carrying component now contains the new data as computed by unit CO.

Figures 11, 12, 13, 14:
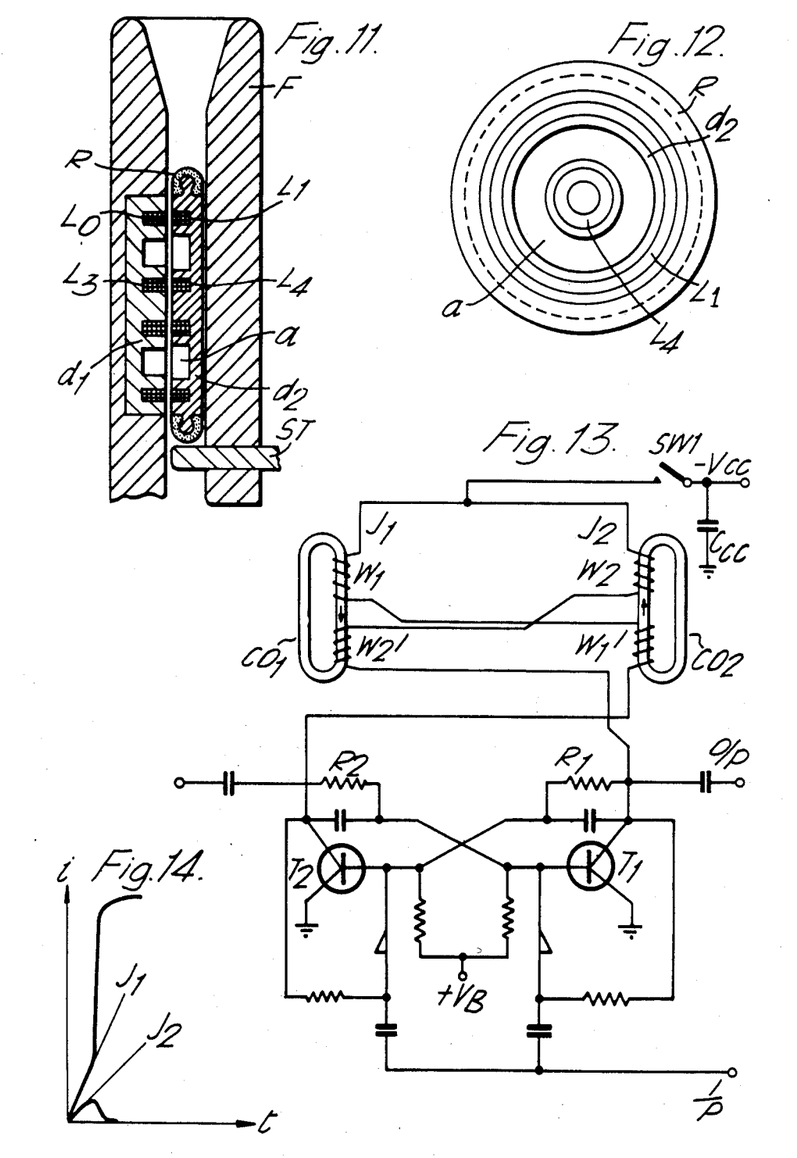
FIG. 11 shows in diametral section an alternative form of data sensor component and data-carrying component.
FIG. 12 shows an axial view of the data-carrying component of FIG. 11.
FIG. 13 is a diagram showing an arrangement by which a flip flop used as a bistable memory unit which would normally require a continuous activating direct current to retain it in a particular setting will always revert to its original setting when the activating current is interrupted and then restored.
FIG. 14 is a diagram provided to assist in the understanding of the operation of the arrangement of FIG. 13, the arrangement of FIG. 13 being of particular use where it is desired that the data-carrying component should not carry its own supply of electrical power.

Referring to FIGS. 11 and 12 the data-carrying component shown therein is in the form of a data disc into which the operating voltages are injected from outside, thus obviating the need for a comparatively powerful internal battery. $L_o$ is the signal inducing coil, $L_3$ the voltage inducing coil connectible to a supply of alternating current, both laid into the wall of a guide duct F. The coils may be magnetically potted by means of two concentric ferric pots d1. The portable data-carrying component $d_2$ contains a signal coil $L_1$, and a supply coil $L_4$ in which sine waves are induced which after rectification furnish the d.c. electrical energy for operation of the circuits in the component $d_2$. This component may advantageously be shaped to match the magnetic paths of $d_1$. The semi-conductor circuits are housed in the recess "a". The coils $L_3$ and $L_4$ correspond with the coils 10 and 15 respectively in FIGS. 2 and 3.

Reference is now made to FIGS. 13 and 14 which illustrate an arrangement by which a particular setting of flip flop unit used is retained in spite of interruption of the operating current supply. The method is based on a preferential magnetic bias producing differentiation in the current of the re-applied voltage source, whereby to render again conductive the transistor previously conductive while the other transistor is forced into the non-conductive mode.

The manner of operation of this arrangement is as follows. It is it assumed that the voltage $-V_{cc}$ is, after having been interrupted, re-applied to the bistable circuit by means of a switch SW1. (In practice this will correspond, for example, to dropping of the disc $d_2$ into the device F, FIG. 11, whereby the coil $L_3$ induces an e.m.f. in $L_4$ which converts into a $V_{cc}$ voltage supply). In any ordinary semi-conductor bistable circuit, there are numerous factors which make it impossible to forecast how the bistable will be switched on. The chances for the previous condition to be re-established are at best 50:50. This arrangement provides for the incorporation of a magnetic loading circuit into each collector leg. The cellector lead of the transistor $T_1$ is shown to be wound around cores $C_1$ and $C_2$. So also is the collector lead of the transistor of the transistor $T_2$, only the magnetizing sense is opposite. (see the direction of winding of $W_1$ and $W'_2$ and $W_2$ and $W'_1$). It is clear that the sense of magnetization of these cores will reflect the state of the bistable switch when current flows through one transistor or the other. On interruption of the current supply the magnetic circuits will retain a remanent magnetic field $\phi_r$ and this will persist for a long period. If, after any time interval, the voltage $-V_{cc}$ is reapplied, this initially will tend to switch on both transistors. In the present arrangement, that transistor current I which tends to reverse the magnetic field in the one loading core will be opposed by a counter-electromotive force, whereas this force will be much less in the other leg because no, or not much, change will be imposed on the magnetic field. As a consequence, $J_1$ and $J_2$ (FIG. 14) will rise unevenly, and even though the initial difference may be small, it will suffice to switch the bistable into the desired state, namely that which it had been in before the current supply was interrupted.

The magnetic loading can be effected by cores, or by ferro-nickel plating of the appropriate connecting leads. Also, in integrated semi-conductor chips, ferric oxides or ferricceramic powder may be deposited around the appropriate connection leads within the chips.

Figure 15:
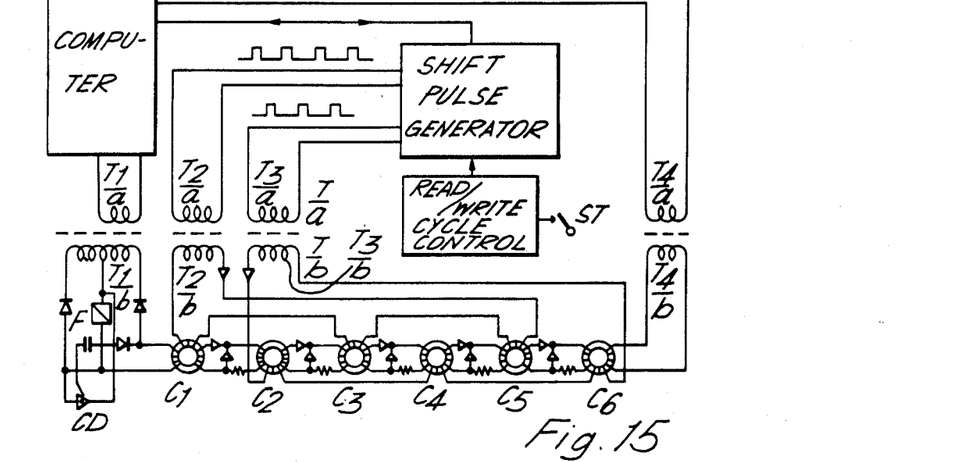
FIG. 15 is a diagram of the circuit of an arrangement employing magnetic core data-storing elements.
Figure 16:
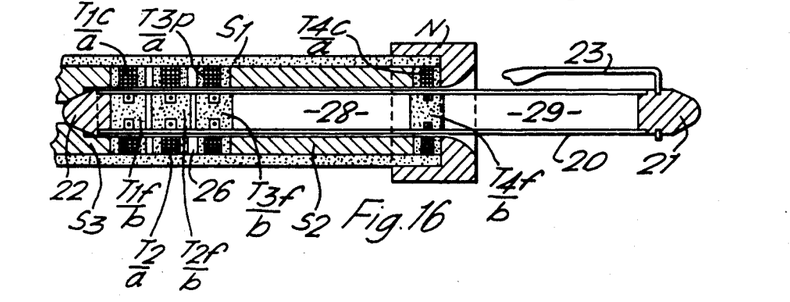
FIG. 16 illustrates diagrammatically and in section a data transfer device arranged to operate with the circuit of FIG. 15.
Figure 17:
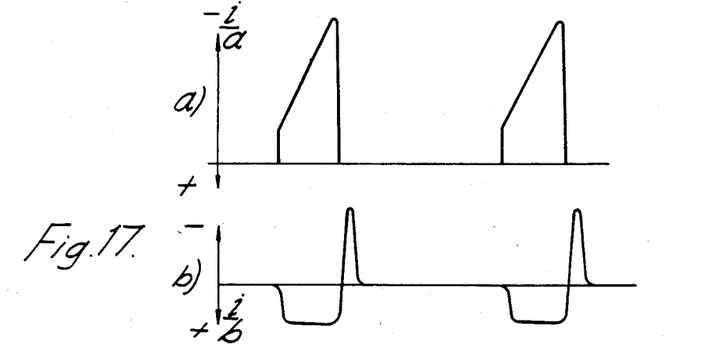
FIG. 17 is a diagram provided to assist in the understanding of the operation of the arrangement of FIG. 15.

It is also possible to replace semi-conductor memory devices entirely by magnetic devices, for example, magnetic shift registers and magnetic logics. Magnetic cores with rectangular hysteresis curves are also suitable, also magnetic films deposited on conductors or insulated surfaces. FIGS. 15, 16, 17 are now referred to. FIG. 15 shows four primary winding coils T/a and four secondary coils T/b. The secondary coils constitute inductive windings of a data carrying component. The primary coils constitute inductive windings of a data sensor component. FIG. 16 is an example of how the said coil groups are disposed so that they may together form a system of pulse transformers. Returning to FIG. 15, $T_1$ is a transformer used for the insertion of information bits. $T_2$ and $T_3$ serve for transmitting two sets of drive signals. For each binary position two cores are needed. FIG. 15 shows six cores which suffice for three bits. $C_1$, $C_3$, $C_5$ retain the bit number, whereas cores $C_2$, $C_4$, $C_6$ merely serve as intermediate bit storage cores. The need for intermediate waiting positions derives from the finite time needed to transfer one bit from one core to another. It is not possible for a core to absorb new information at the same time as it passes its own information to the next core in the chain. The two steps must be carried out in sequence. This explains why one single shift pulse does not suffice, there must be two sets of pulses, alternately passing a binary bit from a so-called ODD Core to a 'waiting' core or EVEN Core, and then from a 'waiting' core to a memory core (ODD core). Initially, the shift pulse generator has no output. If a start signal is obtained from a transducer ST (say, a photoelectric switch responsive to a physical insertion of the data-carrying component into the data sensor component), the Read/Write Cycle Control Unit is triggered, and this unit programs the Read/Check/Compute/and Write sequences.

To read out information from the memory core, square or trapezoid shaped drive pulses are passed through the coils T2/a and T3/a respectively. These shift the signal response by the individual cores bit by bit, into the transformer $T_4$ whose output constitutes the serial data input into the data processing unit CO. This latter compares the data with a pre-coded register to establish validity. If this check is positive, an arithmetic processor uses the data for such operations as are specific to the function of the system. After a delay determined by the computer processing time, a second burst of shift pulses from the Oscillator OSC 1 is applied to the register (not shown) holding the computed output data causing these to be clocked out and passed through the transformer coil T1/a. In phase with the data clock is the shift clock applied to cores $C_2$, $C_4$ and $C_6$ (even cores) whereas 180° out of phase is the shift clock applied to cores $C_1$, $C_3$ and $C_5$.

A practical application of this construction is illustrated in FIG. 16. A penlike tube 20 terminated by end pieces 21 and 22 constitutes a container for the ferrite bobbins and coils T1$f$/b, T2$f$/b, T3$f$/b, spaced by washers of non-magnetic or paramagnetic material. Coil T4$f$/b is shown to be some distance apart. This may be necessary to avoid cross talk signals. The cylindrical spaces 28 and 29 are available for packing into them circuit components as desired, for example, ferrite cores, diodes, resistors, or alternatively integrated semiconductor chips or multi-phase metal oxide silicon registers.

This penlike object which constitutes a data-carrying component is shown as inserted into a tubular data sensor component. As proposed, this sensor component comprises a sleeve $S_1$, a nozzle N and fill-in sleeve $S_2$ and $S_3$ respectively. The coils T1$c$/a, T2$c$/a, T3$c$/a and T4$c$/a are disposed along the inner periphery of a soft-ferrite sleeve $S_1$ (which however may be surrounded by a high-permeability sleeve as a shield against external magnetic fields). The said coils are flanked by washers Tp/a also of ferrite material, which in combination with the sleeve $S_1$ form magnetic enclosures for the coils thus providing a preferred magnetic path into the transformer cores T/b of the inserted portable data-carrying component 20,21,22. The annular air gap between the data-carrying component and the sensor component reduces the transfer efficiency, but on the other hand, constitutes a stabilizing magnetic resistance thereby evening out the drive power requirement for various number transfers which, in the one extreme may contain only one logical "1" bit; or in the other extreme a 50 bit number may contain 50 logical "1" bits, requiring fifty times the drive power. For this reason, an airgap is in fact a useful feature, apart from the greater ease of making the components without close tolerances. The spacing washers 26 between the individual transformers can be made of para-magnetic material to reduce stray fields.

In order to obtain square pulses in the secondary coils without amplifiers and pulse shapers, the shape of the primary pulses may be adapted to be as shown in FIG. 17-a. This will render the secondary pulses to be nearer the desired rectangular pulse shape (FIG. 17-b).

While the system does not lend itself easily to tampering without destroying the device, it could be that unauthorized attempts may be made to try to change the record of the first bit by injecting a voltage. The system would normally work only with negative secondary pulses induced in transformer secondary T1/b, and it can be made sensitive to any initially injected signal starting with the wrong (in this case positive) polarity of the signal. In the example shown (FIG. 15), the detector circuit comprises a controlled diode CD, a condenser, and a fuse F. If it is assumed that a negative and a positive swing follow each other in the secondary coil T1/b, the negative pulse will set the core $c_1$, but also charge a small condenser connected to the controlling electrode of the thyristor or controlled diode CD. When shortly thereafter a positive swing occurs in the coil which can only pass through the left leg of the transformer coil, the larger part of the current can be made to flow through CD which has become conductive. The portion flowing through F cannot affect the fuse. If, however, a positive pulse arrives first, it finds CD non-conductive. Therefore, the voltage builds up and all the current passes through the fuse causing it to fail. This renders the data-carrying component useless since the return path of the core current goes through the fuse to the transformer center gap. Instead of using a fuse (which would have to respond to extremely short current pulses), a fast-acting bistable switch and gate may be used, or a magnetic component may be energized if the current takes the wrong path as described. This magnetic component would be irreversibly switched in such a manner that it decisively changes the impedance path at some point of the magnetic shift register or its output stage thus stopping it from functioning. The theoretical background for doing this can be found in magnetic logic synthesis. By one of these means, or similar means, potential tamperers with the system could be thwarted and traced.

Figure 18:
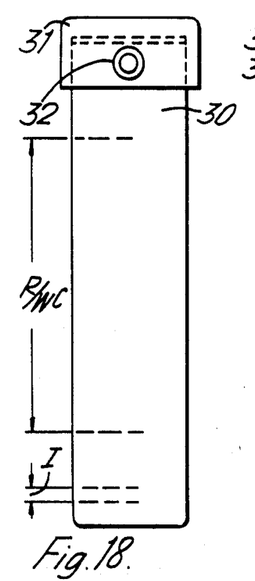
FIGS. 18 and 19 are front and side views, respectively of another form of data-carrying component.
Figure 19:
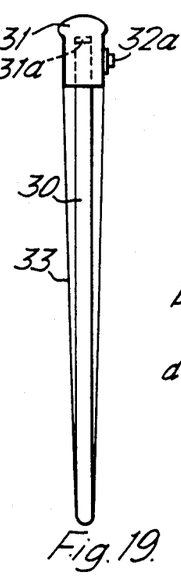
Figure 20:
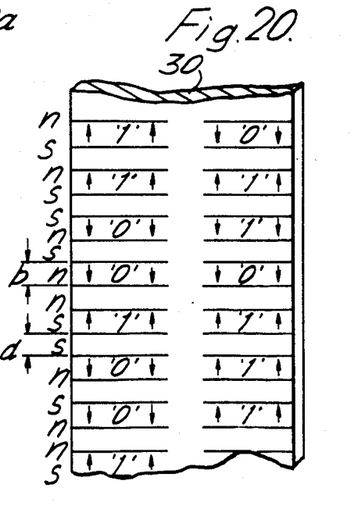
FIG. 20 shows in diagrammatic form a portion of the data-carrying component of FIGS. 18 and 19 showing the disposition of the data-carrying portions thereon.
Figure 21:
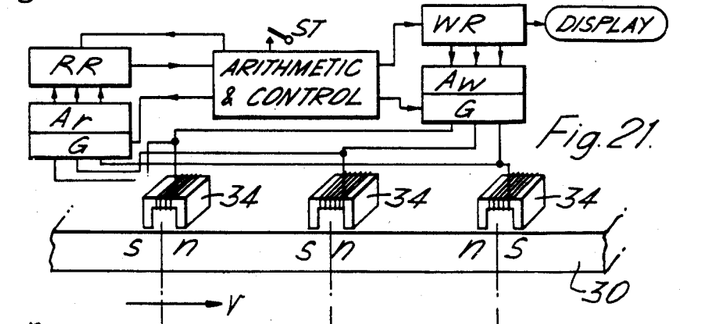
FIG. 21 is a block diagram of a data transfer device employing the component of FIGS. 18 and 19.
Figure 22:
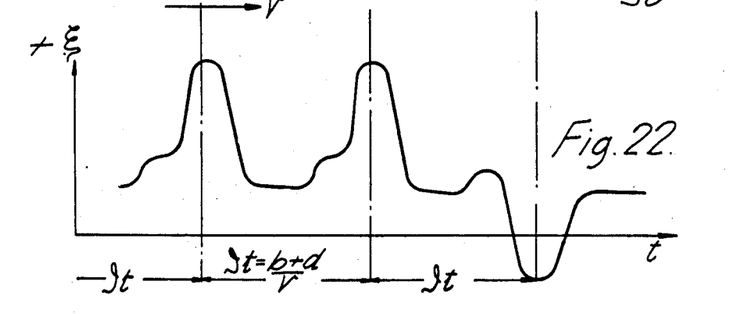
FIG. 22 is a diagram provided to assist in the understanding of the operation of the device of FIG. 21.

The data transfer device may employ a data store which belongs to the family of magneto-strictive delay line devices. As a rule, delay line wires or rods require at least a few feet of length, and this would not be practicable for the present purpose. Several novel features are therefore proposed for reducing the length of such a delay line to the measure of a portable ticket or tablet while also increasing the number of digits bits that can be accommodated on it. FIGS. 18, 19, 20, 21 and 22 are now referred to. The data-carrying component consists of a magneto strictive element which may be a plate or a rod and is shown here as a plate or hollow flat tube 30, topped by a handle 31. The material of the plate is formed of a magneto strictive metal or ferric alloy. The data-carrying component is insertable into a channel in a sensor component containing read/write electro-magnets 34 (FIG. 21) equidistantly disposed along the length R/Wc (see FIG. 18) of the inserted plate. There may be two or more rows of such electro-magnets mounted on both sides of the said channel By connecting each of these magnets to an encoder unit, it is possible to impress upon the metal plate the bit polarities required on each of the well-defined information areas. FIG. 20 shows a portion of the plate enlarged with the said magnetized information areas indicated. The bit width is 'b', the spacing between the bit areas is 'd'. In FIG. 18, close to the bottom of the plate 30, between one end of the plate and the first magnetized portion there is an area designated "I". This area is where a powerful coil surrounds the plate when it is inserted into the operative position in the sensor component. The width of this coil is no greater than the bit width 'b'. A very short current pulse is passed through the coil (not shown). As a consequence an equally short strictional stress is produced in the plate. The stress is propagated as a wave guide in the plate with the speed of sound until it reaches the top edge where its intensity is damped by damping material inserted at 31$a$ (FIG. 19). The moment the strictive pulse passes one of the magnetized portions it causes a momentary change of the field strength of that portion. The polarity of this change depends on the polarity of the information bit on the plate. This change is sensed by the coils 34 (FIG. 21) and converted into electrical signals (FIG. 22). The time interval between the peak of the signals of the two neighboring coils is $t = b + d/v$, $v$ being the sound velocity.

The output from coils 34 is arranged to be fed into a battery of individual amplifiers $A_r$ (FIG. 21), via a gating unit G, and this constitutes the parallel-input into a read register RR. Because of the parallel read-out there is practically no delay between the serial reading process which itself is extremely rapid, and the lodging of the information in the register RR. This information is then processed and inserted into the Write Register WR. The output from each bit of this register is individually amplified in $A_w$ and applied, through gates G, to its corresponding magnet bit or coil 34. In doing so, the processed information is recorded upon the plate 30. At the same time, if so desired, the content of the new data is shown up digitally. To provide some form of protection for the plate, a cloth or leather flap 13 (FIG. 19) may be attached to the handle 31 and be wrapped around the plate. The other side of the flap may be secured by means of a spring button 32, 32a.

Finally, it should be pointed out that any of the portable data-carrying components described may be used for recording variable numbers, or for holding fixed numbers. If the data-carrying component is intended to be merely a kind of identity card, say in conjunction with a method for debiting a service fee (such as a flat fare on public transport systems), the procedure would be that on every occasion that service is used the identity number is recorded on a tape unit fee is small, and thus the incidence of use in frequent, and moreover the number of accounts large, such method of debiting services would necessitate the use of large temporary storage units and occupy too much data processing time. It may therefore be more economical to incorporate into each ticket-like data-carrying component some simple circuitry capable of preventing the readout of the identity number while instead, a fixed check number is read out, or, merely a simple output signal to confirm the presence of a valid identity number without reading out the number itself. The feasibility of such a device is given by combining the ticket with a built-in incidence counter and gate. The counter has, say, ten count stages. The output of only one of these stages enables an electronic gate interposed between one or more of the transformer secondary coils and the register carrying the identity number. That means, that only after every tenth occasion of use, a readout of the identity number is obtained by the detector and recording system. If, for statistical purposes, some readout is desired for the remaining 9 occasions of use the above referred gate circuit may channel the requisite drive pulse via a check register having a constant or location-signifying number register so that instead of the identity number the number of that local register is shifted out and read into the temporary store (tape recorder, etc.). Instead of electronic gates and counters, it is clear that magnetic logical devices and circuits, particularly if used in conjunction with magnetic shift registers, could as well meet the described requirement.

What is claimed is:

1. A proximity data transfer system incorporating a self-contained transportable data carrying component, said system comprising:

first electronic storage means in the data carrying component for storing data in the form of a plurality of data bits;

means in the data carrying component for generating in the environment of said component a serial output of said data in the form of sequential field force changes;

a reactive sensor device external to the data carrying component for converting said sequential field force changes into sequential electric voltage changes whose serial configuration is substantially identical with that of said bits in said first electronic storage means holding said data;

second electronic storage means external to the data carrying component for storing said electric voltage change; and oscillator means external to said data carrying component for impressing pulses on said generating means via said reactive sensor device to effect said serial output;

said oscillator means including means for producing clock pulses and data pulses for transfer into the data carrying component via said reactive sensor device;

and wherein said system further includes:

means for generating pulses of distinguishable characteristics from different portions of said pulses from said oscillator; and means in the data carrying component for channeling said pulses of distinguishable characteristics, interpretable as shift and data pulses, into different parts of electronic storage means in the data carrying component.

2. The apparatus of claim 1 wherein said data carrying component further includes a unidirectional conducting device having a steering electrode to lower and increase respectively the load impedance across the means for generating field force changes in the proximity of the data carrying component in response to serial bit voltage levels clocked out from said first electronic storage means, when applied to the steering electrode of said unidirectional conducting device, said steering electrode being connected to the output terminal of said first electronic storage means in the data carrying component to receive the bit voltage levels of the serially clocked out stored numerical data.

3. The apparatus of claim 1 in which the reactive sensor device external to the data carrying component comprises means for producing non-attenuated and attenuated voltage spikes in accordance with the load impedance changes in the data carrying component, to pass on these spikes to said second electronic storage means for storing the serial bit signal.

4. The system of claim 1 wherein said pulse generating means comprises a differentiator circuit and said pulse channeling means comprises a plurality of diodes coupled to said serial output generating means.

5. A proximity data transfer system incorporating a self-contained transportable data carrying component, said system comprising:

first electronic storage means in the data carrying component for storing data;

means in the data carrying component for generating in the environment of said component a serial output of said data in the form of sequential field force changes;

a reactive sensor device external to the data carrying component for converting said sequential field force changes into sequential electric voltage changes whose serial configuration coincides with that of the bits in said first electronic storage means;

second electric storage means external to said data carrying component for storing said electric voltage changes; and oscillator means external to said data carrying component for impressing pulses on said generating means via said reactive sensor device to effect said serial output;

said data carrying component including a plurality of individual means for sensing field force changes at at least two different predetermined locations adjacent said data carrying component, at least one of said sensing means serving to sense field force changes representing shift pulse signals, and at least one other of said sensing means serving to sense field force changes representing input data to, and output data from, said first electronic storage means.

6. The system of claim 5 wherein said first electronic storage means comprises a magnetic shift register.

7. The apparatus of claim 1 or 5 wherein said data carrying component includes a plurality of gating means for enabling read out of said data in said first electronic storage means in said data carrying component and subsequent storage of data therein, and a counter coupled to said gating means for controlling said gating means to provide a read out phase and a subsequent write phase responsive to the number of count pulses received via said reactive sensor device.

8. The apparatus of claim 7 wherein the data carrying component includes a clock pulse oscillator to return the programming counter and the circuits controlled thereby to true quiescent conditions where one or more spurious count pulses have disturbed these conditions.

9. The apparatus of claim 1 or 5 wherein said reactive sensor is disposed along a substantially sleeve-like body and the data carrying component has a substantially rod-like shape, to enable the proximity conditions favorable for data transfer to be established.

10. The apparatus of claim 1 or 5 wherein said reactive sensor device is housed in the side walls of a slot, and the data carrying component has the shape of a disk which can be dropped into said slot, to provide the proximity conditions for a transfer of data via field force changes in the environment of the data carrying component.

11. The apparatus of claim 1 or 5 wherein said data carrying component includes sensor and check circuits responsive to an incorrect, non-programmed sequence of the data injected via field force changes into the said component, to set up high impedance links which prevent the passage of operational signals between the reactive sensor device and the data carrying component and the number holding registers thereof.

12. The apparatus of claim 1 or 5 further including means for transferring electrical energy from a source external to the data carrying component to said means in the data carrying component.

13. A portable data carrying token for manifesting data stored therein to an external device without necessitating relative motion therebetween, said external device having oscillator means for generating pulses to be impressed on the token, said data carrying token comprising:

electronic storage means for storing data therein in the form of a plurality of data bits;

means in the data carrying token for generating in the environment of said component a serial output of said data in the form of sequential field force changes; and a plurality of individual means for sensing field force changes at at least two different predetermined locations adjacent said data carrying component, at least one of said sensing means serving to sense field force changes representing shift pulse signals from the oscillator means and at least one other of said sensing means serving to sense field force changes representing input data to, and output data from, said electronic storage means.

14. The apparatus of claim 1 or 13 wherein the electronic storage means in the data carrying component comprises bistable semi-conductor circuits in whose output leads are placed magnetic loads made of retentive material to enable the bistable semiconductor circuits to memorize their state, in spite of an interuption of the electric current supply.

15. The apparatus of claim 1, 13 or 5 wherein said data carrying component includes a long-life battery to maintain the state of the register of the data carrying component during intervals between use cycles.

16. The apparatus of claim 15 wherein said data carrying component includes means for charging the battery when the data carrying component is in a use cycle.

17. The apparatus of claim 13 wherein said generating means comprises a diode coupled to said sensing means and said storage means.

18. The apparatus of claim 13 wherein said storage means includes a register, setting means for establishing a predetermined data word in said register, and means responsive to said generating means for disabling said setting means when said data is being clocked out from said register.

19. The apparatus of claim 13 wherein said data carrying token further includes means responsive to the receipt of a spurious signal by said sensing means for realigning said data in said storage means.

20. The apparatus of claim 13 wherein said data carrying token includes a plurality of gating means for enabling read out of said data in said electronic storage means and subsequent storage of data therein, and a counter coupled to said read out phase and a subsequent write phase responsive to the number of pulses received via said sensing means.

21. The apparatus of claim 13 wherein said storage means comprises bistable semiconductor circuits in whose output leads are placed magnetic loads made of retentive material to enable the bistables to memorize their state in spite of an interruption of the electric current supply.

22. The apparatus of claim 13 wherein said data carrying token further includes means for transferring electrical energy from an external source to said storage means.

23. The apparatus of claim 13 wherein said sensing means comprises an inductive means and a unidirectional conducting device coupled to said inductive means.

24. The apparatus of claim 23 wherein said unidirectional conducting device includes a steering electrode for lowering and increasing, respectively, the load impedance across said inductive means in response to serial bit voltage levels clocked out from said storage means, when applied to said steering electrode, said steering electrode being coupled to the output terminal of said storage means to receive the bit voltage levels of the serially clocked out stored data.

25. The apparatus of claim 23 wherein said inductive means is disposed along a substantially sleeve-like body and the data carrying token has a substantially rod-like shape, to enable the proximity conditions favorable for data transfer to be established.

26. The apparatus of claim 23 wherein said inductive means comprises a conductive loop and the data carrying component has the shape of a disc which can be dropped into an associated slot, to provide the proximity conditions for a transfer of data via field force changes in the environment of the data carrying component.

27. A proximity data transfer device for use with a self-contained transportable data carrying component having a single reactance member for generating a plurality of data field force changes representative of more than one bit of the data in electronic storage means in said component in response to receipt of clock field force changes, said data transfer device comprising:

oscillator means for generating clock pulses and data pulses for transfer into the data carrying components;

means for generating pulses of distinguishable characteristics from different portions of said pulses from said oscillator means, the data carrying component having means for channeling the pulses of distinguishable characteristics, interpretable as shift and data pulses, into different parts of the electronic storage means in the data carrying component;

a single reactive transfer device coupled to said oscillator means for generating clock field force changes in response to receipt of said clock pulses and for sensing said data field force changes generated by said data carrying component while said transfer device is relatively stationary with respect to said data carrying component; and electronic storage means coupled to said transfer device for storing data corresponding to said data field force changes sensed by said transfer device.

28. The device of claim 27 further including means coupled to said oscillator means for supplying signal representative of data to be transferred to said data carrying component, said reactive transfer device being coupled to said data signal supplying means to generate field force changes representative of said data signals for sensing by said data carrying component.

* * * * *

UNITED STATES PATENT AND TRADEMARK OFFICE
CERTIFICATE OF CORRECTION

PATENT NO. : 4,661,691

DATED : April 28, 1987

INVENTOR(S) : John W. Halpern

It is certified that error appears in the above-identified patent and that said Letters Patent is hereby corrected as shown below:

On the face of the patent, please add the following:

Foreign Application Priority Data

Feb. 28, 1969  GB 10789/69
March 10, 1969 GB 10789/69
March 28, 1969 GB 10789/69
April 9, 1969  GB 10789/69
Sept. 5, 1969  GB 44166/69
Dec. 22, 1969  GB 62238/69

Signed and Sealed this

Twenty-sixth Day of September, 1989

Attest:

DONALD J. QUIGG

*Attesting Officer*  *Commissioner of Patents and Trademarks*